United States Patent
Wecht

(10) Patent No.: US 7,015,748 B2
(45) Date of Patent: Mar. 21, 2006

(54) DC-DC CONVERTER CIRCUIT FOR CONVERTING AN INPUT VOLTAGE TO AN OUTPUT VOLTAGE WITH A PREDETERMINED HOLDOVER TIME

(75) Inventor: Gerhard Wecht, Rimbach (DE)

(73) Assignee: Bosch Rexroth AG, Lohr am Main (DE)

( * ) Notice: Subject to any disclaimer, the term of this patent is extended or adjusted under 35 U.S.C. 154(b) by 49 days.

(21) Appl. No.: 10/787,696

(22) Filed: Feb. 26, 2004

(65) Prior Publication Data
US 2004/0189267 A1    Sep. 30, 2004

(30) Foreign Application Priority Data
Feb. 27, 2003    (DE) ............................... 103 08 411

(51) Int. Cl.
*G05F 1/10* (2006.01)

(52) U.S. Cl. ...................................... 327/589; 327/538

(58) Field of Classification Search ................ 327/589, 327/538, 321; 307/64
See application file for complete search history.

(56) References Cited

U.S. PATENT DOCUMENTS

| 4,827,151 A | * | 5/1989 | Okado ......................... 307/66 |
| 5,258,901 A |   | 11/1993 | Fraidlin |
| 6,043,705 A | * | 3/2000 | Jiang ........................... 327/589 |

* cited by examiner

*Primary Examiner*—Shawn Riley
(74) *Attorney, Agent, or Firm*—Michael J. Striker

(57) ABSTRACT

The DC-DC converter circuit has a converter unit for conversion of an input voltage to an output voltage; a first capacitor for maintaining a value of the output voltage for a predetermined holdover time; a charging circuit for charging the capacitor with a supply voltage that is greater than the input voltage and a discharging circuit for providing charge to the converter circuit from the charged capacitor when the input voltage is interrupted, whereby the output voltage is maintained for a predetermined holdover time.

11 Claims, 4 Drawing Sheets

D.C.-D.C. Converter Circuit

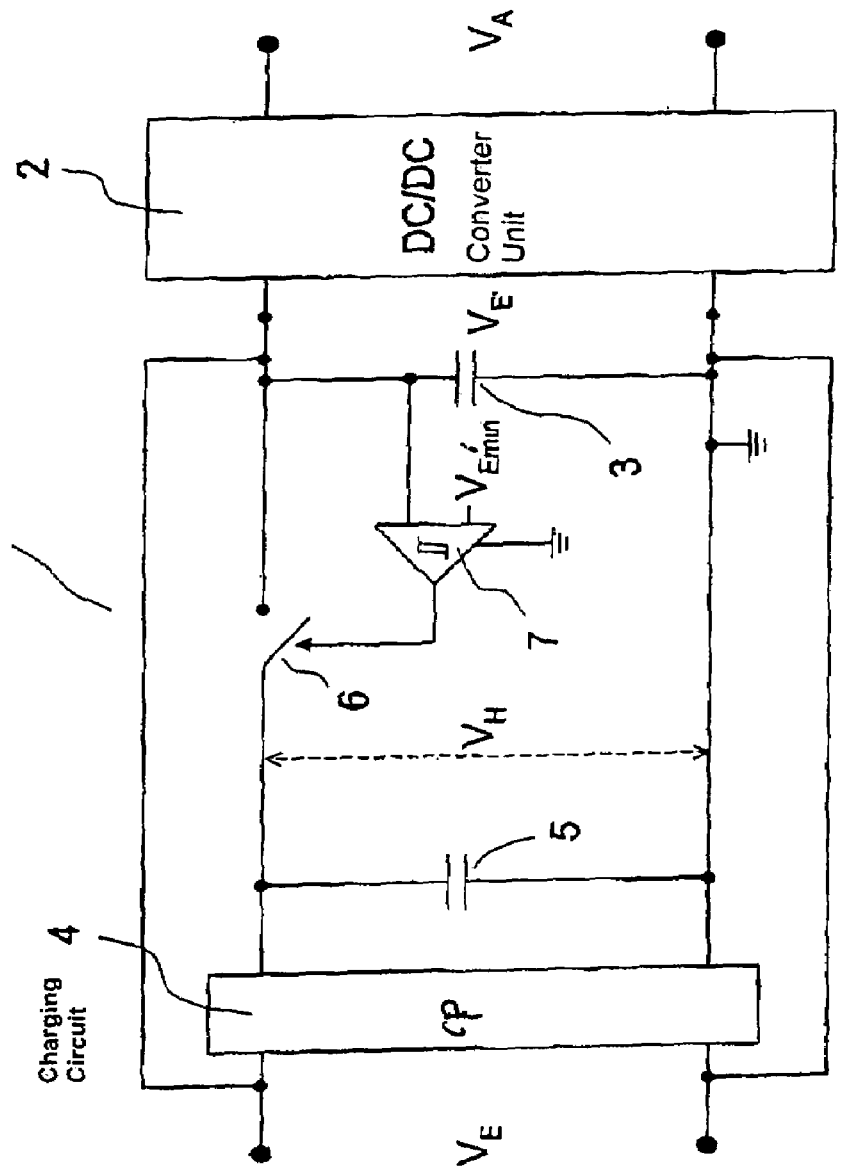

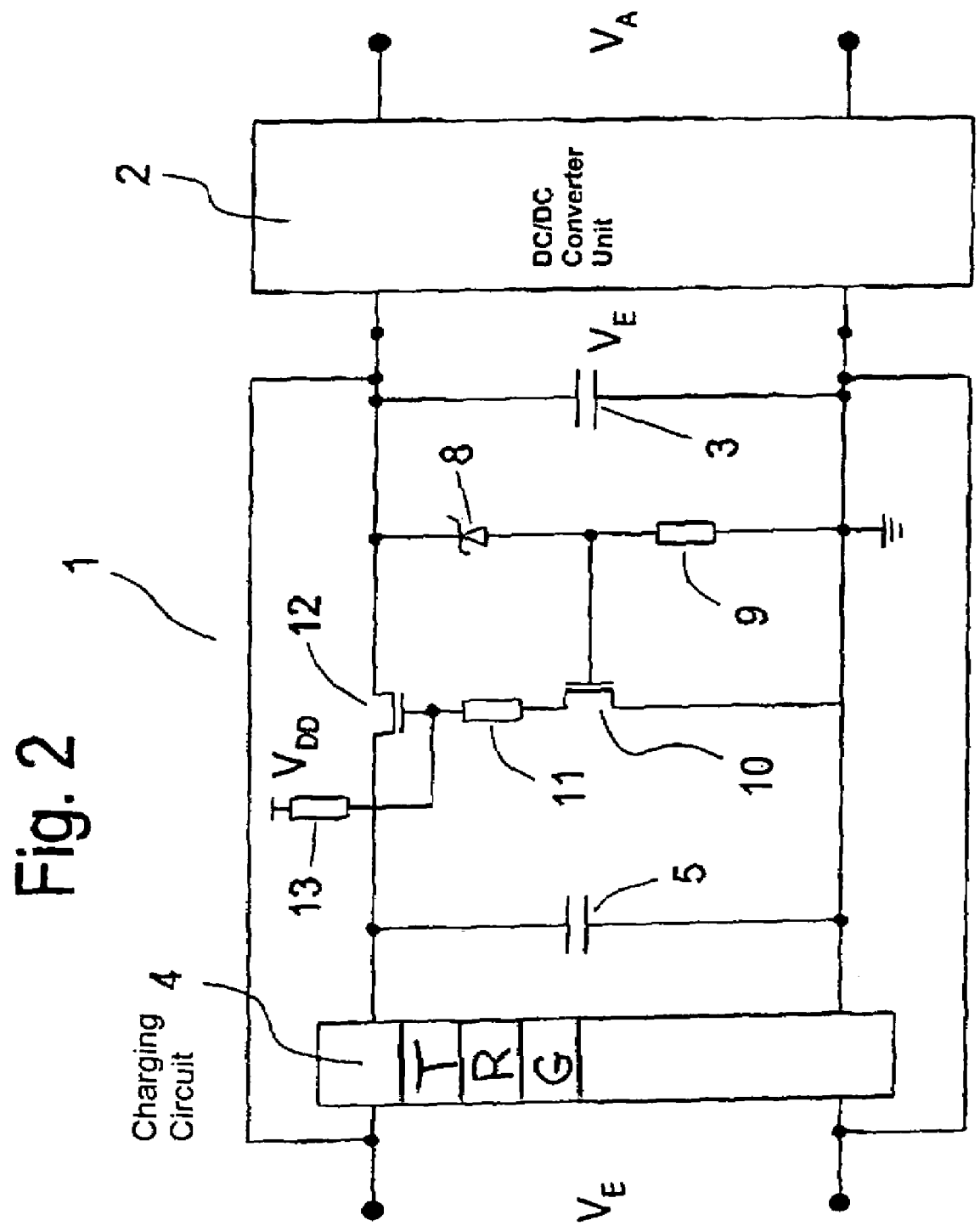

DC-DC CONVERTER CIRCUIT FOR CONVERTING AN INPUT VOLTAGE TO AN OUTPUT VOLTAGE WITH A PREDETERMINED HOLDOVER TIME

BACKGROUND OF THE INVENTION

1. Field of the Invention

The present invention relates to a DC-DC converter circuit and a method for operating the DC-DC converter circuit.

2. Description of the Related Art

DC-DC converter circuits conventionally have a converter unit, which has an input and an output. An input voltage is applied to its input and an output voltage is available at its output. The output voltage remains constant for a predetermined input voltage range, when a predetermined nominal load at the output is not exceeded. The input voltage is generally buffered or floated by means of a capacitor. The input voltage is applied to this capacitor via a decoupling diode. For example, this is also described in U.S. Pat. No. 5,258,901.

The capacitor at the input of the converter circuit guarantees the maintaining of the output voltage for a predetermined minimum time, e.g. 10 msec, under nominal load. This means that the voltage, which is present at the capacitor when the applied input voltage is interrupted and which corresponds essentially to the height of the supply voltage at the time of interruption deducting the conducting voltage of the decoupling diode, produces a short-duration additional supply of the converter unit. Thus the DC-DC converter draws the power, which should be delivered at the output of the DC-DC converter circuit during the required holdover time.

Particularly if the required holdover time must be guaranteed when the input voltage drops below a minimum value determined by the converter circuit, large capacitors are required to guarantee the holdover time.

The holdover time of a DC-DC converter circuit can be increased, when the input capacitance for storing the input voltage is increased. Especially the space required for this sort of capacitance is enormous with increasing holdover time, because a high capacitance must be built up from several individual capacitors. Because of the large space requirements there is a considerable risk of errors because of possible contact faults. Furthermore it would be desirable to be able to reduce the capacitance for buffering the input voltage, in order to provide a smaller DC-DC converter circuit.

SUMMARY OF THE INVENTION

It is an object of the present invention to provide a DC-DC converter circuit, which has a long holdover time and reduced spatial requirements for the input capacitors.

This object and others, which will be made more apparent hereinafter, are attained in a DC-DC converter circuit comprising a converter unit for converting an input voltage applied to an input of the converter unit to an output voltage having a predetermined value and a capacitor for maintaining the value of the output voltage for a predetermined time interval on interruption of the input voltage applied to the input of the converter unit.

According to the invention the DC-DC converter circuit includes a charging circuit for charging the capacitor with a supply voltage that is larger than the input voltage and a discharging circuit for charging the converter unit from the capacitor on interruption of the input voltage, whereby the value of the output voltage is maintained for the predetermined time interval, i.e. the holdover time.

Preferred embodiments of the above-described DC-DC converter circuit according to the invention are claimed in the appended dependent claims and described hereinbelow.

According to a first aspect of the present invention a DC converter circuit is provided with a converter unit. The converter unit converts an input voltage to an output voltage of a predetermined voltage value. The predetermined voltage value is maintained constant as long as the input voltage is within a predetermined voltage range. A capacitance is provided in order to make a voltage available at the input of the converter unit when the input voltage is interrupted or omitted, so that the output voltage of the converter unit is maintained at its predetermined voltage value for a predetermined time interval.

This predetermined time interval is conventionally called the holdover time.

According to the invention the DC converter circuit has a charging circuit in order to charge the capacitor with a supply voltage that is greater than the input voltage. Further a discharging circuit is provided in order to supply the converter unit with charge from the capacitor when the input voltage is interrupted or fails, so that the output voltage of the converter unit is maintained at its predetermined voltage value for the predetermine time interval.

The basic concept of the invention is to supply charge in the capacitor with a higher voltage than the predetermined input voltage in order to increase the stored charge, without increasing the capacitance of the capacitor at the same time. In this way charge storage can be provided, so that charge can be made available to the converter unit when the input voltage is cut off or interrupted, so that the output voltage can be maintained for the predetermined holdover time.

The invention has the advantage that the capacitance for the input voltage can be reduced and thus the spatial requirements and the use of individual components can be considerably minimized.

The capacitance can thus be considerably reduced because the voltage drop, which is available for buffering the or floating the input voltage enters quadratically into the energy balance.

$$C = P \times \{t / [U_{charging\ voltage} - U_{minimum\ input\ voltage}]^2\}$$

This shows that a considerable charge can be stored with the potential difference between the charging voltage of the capacitor and the minimum input voltage of the converter unit, which is determined by the converter unit. Thus the capacitance can clearly be reduced by a factor equal to the square of the voltage difference at equal holdover time and load.

In a preferred embodiment the charging circuit can comprise a transformer, a rectifier and/or an alternating current generator supplied by the input voltage, in order to charge the capacitor with increased supply voltage. This can also be achieved by a charge pump, which is supplied by the input voltage and produces a potential, which is greater than the input voltage, in order to charge the capacitor.

Preferably a second capacitor to be charged with the input voltage is provided, which is connected to the input of the converter unit. The charging circuit is then formed to deliver the charge of the first capacitor to the second capacitor in the event that the input voltage is interrupted or cut off. In this way the discharging circuit can be considerably simplified, since it does not need to provide a current for the converter unit continuously. The supply voltage of the second capacitor need only be maintained at a given voltage level during the holdover time, in which the converter unit can still produce the output voltage for the given load level.

In a further preferred embodiment the discharging circuit couples the first capacitor with the second capacitor so that the first capacitor delivers its charge to the second capacitor, when the potential difference stored in the second capacitor drops below a lower threshold value. The lower threshold value is determined by a potential difference, at which the converter unit can still supply the required output voltage at its output.

In this way the converter unit is operated in the vicinity of the minimum input voltage provided to the converter unit.

In another preferred embodiment the discharging circuit has a switching device, by which the first capacitor is coupled with the second capacitor. The discharging circuit can have a detection circuit, in order to establish whether or not the potential difference stored in the second capacitor exceeds a threshold value. The switching device is controlled in this case so that the first capacitor is connected with the second capacitor in order to deliver charge from the first capacitor to the second capacitor, when the potential difference stored in the second capacitor drops below a predetermined voltage threshold value. In this way it can guarantee that the potential difference in the second capacitor does not fall below the lower threshold value during the holdover time.

So that the entire charge in the first capacitor does not flow into the second capacitor on gating the switching device and thus provide an input voltage at the converter unit that exceeds a maximum permissible input voltage or a voltage which is above the gating voltage of the second capacitor, the second capacitor is connected with the first capacitor for a sufficient time interval, until the stored potential or voltage difference in the second capacitor exceeds an upper threshold value, which is above the lower threshold value by a predetermined amount. In this way the stored potential difference in the second capacitor fluctuates around a predetermined value between the upper and the lower threshold values, whereby it is guaranteed that neither a too small nor a too large input voltage is applied to the converter unit.

In this regard the detection circuit can be provided with a comparator circuit with a hysteresis in a particularly preferred embodiment, which realizes the lower threshold value and the upper threshold value.

According to a further aspect of the present invention a method for operating a DC converter circuit with a converter unit is provided. In this method a capacitor is charged with a supply voltage that is greater than the input voltage when the input voltage is interrupted. Charge from the capacitor is supplied to the converter unit when the input voltage is cut off or interrupted so that the output voltage is maintained a constant during a predetermined time interval, namely the holdover time.

BRIEF DESCRIPTION OF THE DRAWING

The objects, features and advantages of the invention will now be illustrated in more detail with the aid of the following description of the preferred embodiments, with reference to the accompanying figures in which:

FIG. 1 is a block circuit diagram of a first preferred embodiment of a DC-DC converter circuit according to the invention;

FIG. 2 is a block circuit diagram of a second preferred embodiment of a DC-DC converter circuit according to the invention.

DETAILED DESCRIPTION OF THE INVENTION

Figure 1B:
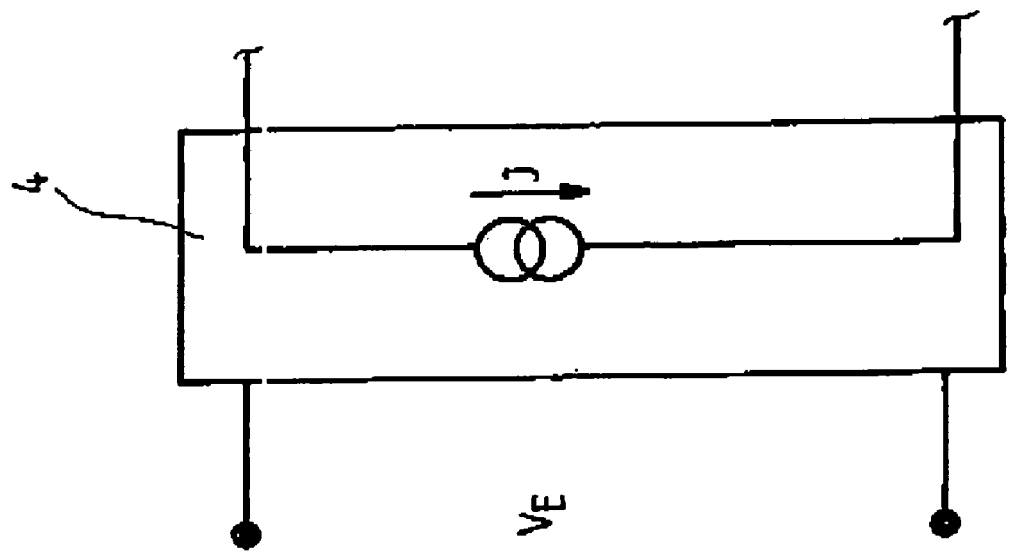
FIG. 1b shows a charge pump realized by a constant current supply (I)
Figure 1A:
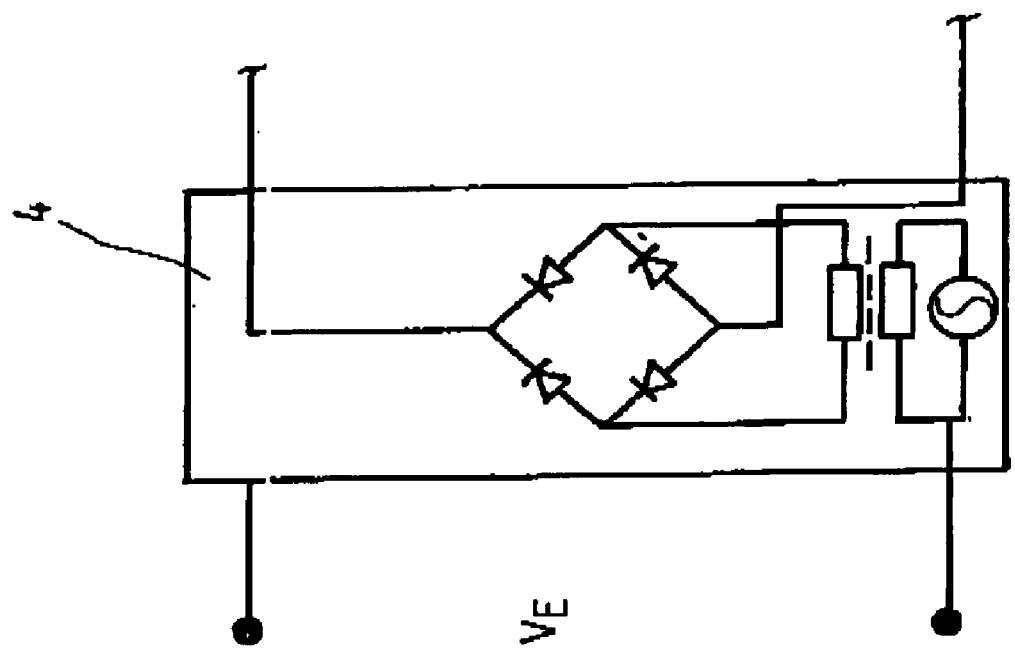
FIG. 1a shows the charge circuit with a transformer, rectifier and an AC voltage generator controlled by the input DC voltage.

A first preferred embodiment of the DC-DC converter circuit 1 is shown in FIG. 1. The DC-DC converter circuit includes a converter unit 2, which converts an input voltage $V_E$ to an output voltage $V_A$. The converter unit 2 functions so that the output voltage $V_A$ is kept constant under nominal load when the input voltage $V_E$ is in an input voltage range between a minimum input voltage $V_{E'min}$ and a maximum input voltage determined by ability of the components in the converter unit 2 to withstand load.

The converter unit 2 can be embodied as a transformer converter or a reactive converter. That is the converter unit 2 can e.g. have a transformer or a reactive element or elements for transforming an applied voltage. An alternating or pulsed voltage generated from a DC voltage is applied to an input of the transformer or reactive element or elements. A transformed AC voltage is available at the secondary side of the transformer. The desired DC output voltage $V_A$ is produced by rectification and smoothing the transformed AC voltage. This output voltage is kept constant, since the generation of the alternating voltage is adjusted to the available supply voltage, e.g. by pulse width modulation. A blocking converter, a conducting converter or a push-pull converter, among others, can be used to prepare the AC voltage on the primary side of the transformer. These circuits are conventionally used in logic or switching circuits and assumed known in the following.

The converter unit 2 can also be constructed like a linear regulator, i.e. without galvanic separation between the input and output parts of the converter unit 2.

The DC-DC converter circuit 1 frequently is required to maintain the output voltage $V_A$ for a predetermined time, namely the so-called holdover time, under a nominal load after interruption of the supply voltage $V_E$. In current DC-DC converter circuits this is achieved because the DC input voltage $V_E$ is buffered with a capacitance, which charges the converter unit 2 after interruption of the supply voltage $V_E$ and thus permits the maintaining of the output voltage $V_A$ during the holdover time.

The longer the holdover times, the larger the capacitance found at the input of the converter unit 2. Such capacitance requires much space, especially then it must be built up from several individual capacitors.

This sort of capacitance buffering of the supply voltage $V_E$ is shown in FIG. 1. A working capacitor 3 is provided, which is connected to both input terminals of the converter unit 2, across which the supply voltage $V_E$ is applied. A first input terminal of the converter unit 2 is connected with a first terminal of the working capacitor 3 and a second input terminal of the converter unit 2 is connected with a second terminal of the working capacitor 3 and with a fixed ground potential GND.

A charging circuit 4 is connected to the supply voltage $V_E$. The charging circuit 4 charges an auxiliary capacitor 5 when the supply voltage $V_E$ is applied to it. The charging circuit 4 is formed so that a charging voltage is produced for the auxiliary capacitor 5 from the supply voltage $V_E$, which is larger than the supply voltage $V_E$.

The generation of the charging voltage can occur in different ways. First it is possible to provide a charge pump cp (as shown in FIG. 1) supplied by the supply voltage $V_E$, which charges the auxiliary capacitor 5 to the charging voltage, which is greater than the supply voltage $V_E$. Alternatively an auxiliary coil can be provided in a transformer T already provided in the converter unit 2, whose coil number is selected so that an alternating voltage arises, whose peak voltage is above the supply voltage $V_E$. The alternating voltage produced thereby can be rectified with the help of a rectifier R and made available as the charging voltage for the auxiliary capacitor 5. In other embodiments an AC generator G can be provided (FIG. 2).

It is also possible to provide an auxiliary coil in a supply inductance or reactance component, which is used in the converter unit 2. This auxiliary coil can be dimensioned so that an alternating voltage is produced, which has a potential difference between the peak voltages that is greater than the supply voltage $V_E$. Also in this embodiment the alternating voltage produced can be rectified with the help of a rectifier and then made available to charge the auxiliary capacitor 5.

After turning on the supply voltage VE the auxiliary capacitor 5 can be charged in a current limited manner with the help of the charging circuit 4. As long as the supply voltage $V_E$ is applied, the auxiliary capacitor 5 is separated from the input of the converter unit 2 and/or of the working capacitor, so that a high charging voltage is not directly applied to the input of the converter unit 2. The switch 6 is operated to separate the auxiliary capacitor 5 and the working capacitor 3. The switch is controlled by the output of comparator circuit 7, in which a hysteresis is realized.

The switch 6 and the comparator circuit 7 form a discharge circuit for the auxiliary capacitor 5. A first input of the comparator circuit 7 is connected with a first terminal of the working capacitor 3. A predetermined lower threshold voltage is applied to a second input of the comparator circuit 7, which is essentially below the allowed minimum input voltage $V_{E'min}$ of the converter unit 2 by a small amount. Preferably this lower threshold voltage is below the allowed minimum input voltage $V_{E'min}$ by about 0 to 2 volts.

When the value of the supply voltage $V_E$, e.g. in a complete failure or interruption, drops below the threshold voltage $V_{E'min}$, the comparator circuit 7 activates the switch 6, so that a first terminal of the auxiliary capacitor 5 is connected with the first terminal of the working capacitor 3 and with an input conductor of the converter unit 2. Since the second terminal of the auxiliary capacitor 5 and the working capacitor are at the ground potential GND, charge stored in the auxiliary capacitor 5 now flows into the working capacitor 3 and the converter unit 2. Because of that the working capacitor 3 is charged so that the charge stored in it is increased and the voltage between the first terminal and the second terminal of the working capacitor increases.

The comparator circuit 7 has a hysteresis, so that the switch 6 is not immediately opened after exceeding the threshold voltage $V_{E'min}$. Instead, an upper threshold must be first exceeded in order to open the switch 6. The upper threshold value is the minimum input voltage $V_{E'min}$ plus a small voltage value, e.g. 1 to 2 volts. Thus it is guaranteed that the working capacitor 3 is not charged to a voltage, which is too high for the subsequent circuit components in the converter unit 2 so that they can be destroyed. Furthermore the hysteresis provides that the discharging circuit produces no fluctuations, which negatively affect the converter unit 3.

If the upper threshold value is reached by a flow of charge from the auxiliary capacitor 5 to the working capacitor 3, the switch is again opened and the converter unit 2 is now again exclusively supplied with voltage by the working capacitor 3. Since a voltage is available at the output of the converter unit 2 and a current is available for the nominal load, charge flows through the converter unit 2 from the working capacitor 3. Because of that its charge and the applied voltage decrease. When it falls below the lower threshold value $V_{E'min}$, the switch 6, as described above, is closed once again so that fresh charge flows from the auxiliary capacitor 5 into the working capacitor 3. This takes place until the voltage in the auxiliary capacitor 5 reaches the minimum input voltage $V_{E'min}$, which is required for operation of the converter unit 2.

In FIG. 2 an additional embodiment of a discharging circuit for the DC-DC converter circuit according to the invention is shown. The same drawing reference numbers as in FIG. 1 designate the same elements.

The DC-DC converter circuit of FIG. 2 similarly has a converter unit 2, a working capacitor 3, a charging circuit 4 and an auxiliary capacitor 5 like the embodiment shown in FIG. 1. The discharging circuit has a Zener diode 8 and a first resistor 9. A first terminal of the Zener diode 8 is connected with the first terminal of the working capacitor 3. A second terminal of the Zener diode 8 is connected with a first terminal of the resistor 9. A second terminal of the resistor 9 is connected with the second terminal of the working capacitor 3, with the second terminal of the auxiliary capacitor 5 and with ground potential.

When the input of the converter circuit 2 is at a desired input voltage $V_{E'}$, i.e. the input voltage $V_E$ is in a certain working range determined by the converter unit 2, a breakdown or break-through current flows through the Zener diode 8, which causes a voltage drop in the first resistor 9 with an approximately constant Zener potential.

In this way a voltage, which is above ground potential, is applied to the first terminal of the first resistor 9 or to the second terminal of the Zener diode 8. This voltage is used as control voltage for a first N-channel transistor 10. The first N-channel transistor 10 is connected with a first terminal with ground potential with a second terminal with a first terminal of a second resistor 11. A second terminal of the second resistor 11 is connected with a control terminal of a second N-channel transistor 12.

So that the potential at the control input or terminal does not freely oscillate with a blocked first N-channel transistor 10, a pull-up resistor 13 is provided, which is connected with its first terminal with the control terminal of the second N-channel transistor and with its second terminal with a high supply voltage $V_{DD}$.

The second N-channel transistor 12 acts as a switch so that a first terminal of the second N-channel transistor 12 is connected with the first terminal of the auxiliary capacitor 5 and a second terminal of the N-channel transistor 12 is connected with the first terminal of the working capacitor 3.

If the input voltage $V_E$ at the converter unit 2 is above the lower threshold value, the Zener diode 8 is in its break-down state and a potential due to the break-down current in the first resistor 9 is applied to the control terminal of the first N-channel transistor 10. Because of that the first N-channel transistor 10 is driven so that the potential at the control terminal of the second N-channel transistor 12 is drawn toward the ground potential by the second resistor 11. The second N-channel transistor 12 is then blocked.

If the potential between the terminals of the working capacitor 3 falls, e.g. after an interruption of the supply voltage $V_E$ and this voltage reaches the lower threshold value, the Zener diode 8 becomes non-conducting or blocking abruptly, so that there is no voltage drop across the first resistor 9.

When the ground potential then is applied to the control terminal of the first N-channel transistor 10, this block that transistor and the potential at the control terminal of the second N-channel transistor 12 rises to the high supply voltage $V_{DD}$, so that it is switched to conducting and the first terminal of the auxiliary capacitor 5 is connected with the first terminal of the working capacitor 3, so that charge can flow from the auxiliary capacitor 5 to the working capacitor 3.

Now the voltage at the working capacitor 3 increases until the Zener diode 8 breaks down and the break-down current flows, which causes a voltage drop across the first resistor 9. The first N-channel transistor 10 conducts and blocks the second N-channel transistor 12, so that the auxiliary capacitor 5 is separated from the input range of the converter unit 2.

The dimensioning of the Zener diode 8 and the first N-channel transistor 10 must take place so that a definite lower and upper voltage threshold is defined by it. A hysteresis, which extends over a few volts, may be realized by the selection of the Zener diode 8 and the gate-source voltage of the N-channel transistor 10. Because of that it is guaranteed that the separation of the auxiliary capacitor 5 and the working capacitor 3 is performed before the voltage in the working capacitor 3 exceeds a value, which is damaging to the components of the converter unit 2. The lower threshold is determined essentially by the lower voltage threshold value, at which the converter unit can still deliver a constant output voltage $V_A$.

Figure 3:
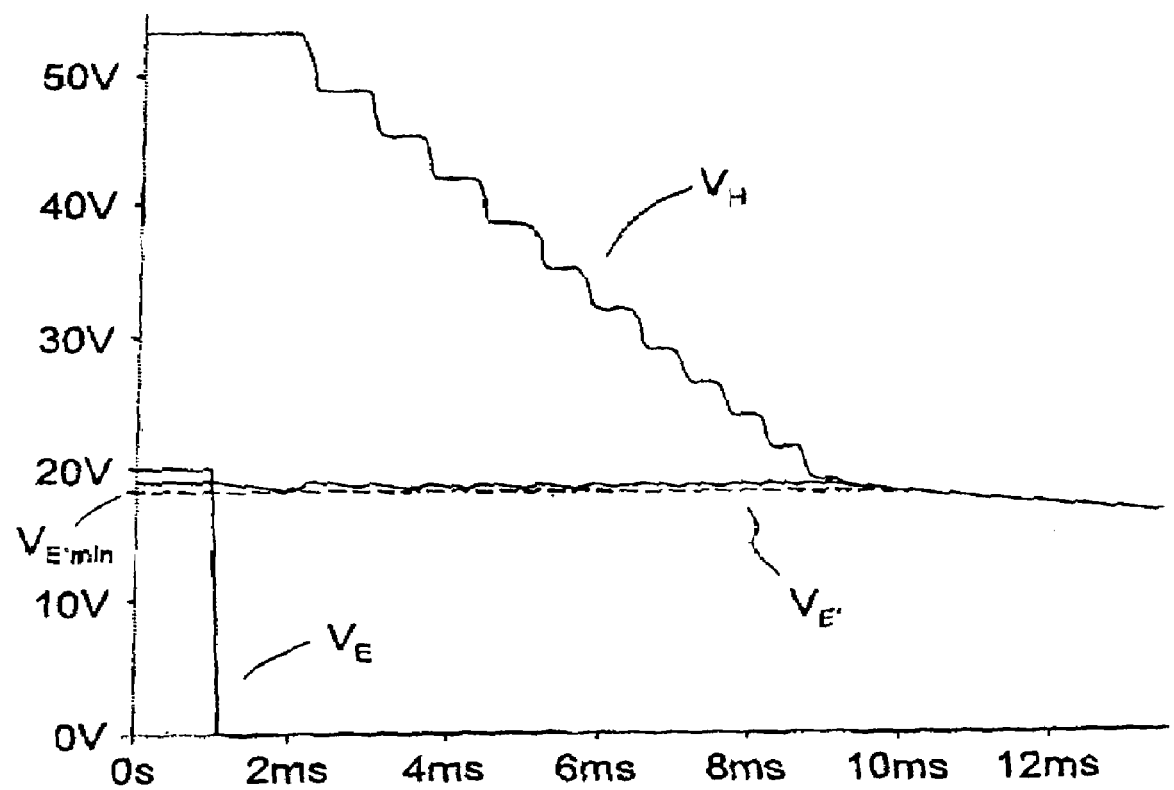
FIG. 3 is a graphical illustration showing the time dependence of voltages at an auxiliary capacitor and a working capacitor.

FIG. 3 shows the variation of the supply voltage $V_E$, the input voltage $V_{E'}$ and the charging voltage $V_H$ across the capacitor 5 with time. In a starting state the DC-DC voltage converter circuit is operated with a supply voltage of 20 V, so that in the starting state with the applied supply voltage as the input voltage $V_{E'}$ similarly 20 volts is applied to the input of the converter unit 2. The charging circuit 4 has charged the auxiliary capacitor 5 to a predetermined maximum voltage $V_H$=55 volts after turning on the supply voltage $V_E$.

If the supply voltage $V_E$ now drops within a milliseconds as in the example shown in FIG. 3, the working capacitor 3 discharges and a charge from it flows into the converter unit 2.

The amount of the charge flow into the converter unit 2 is determined by the load, which is applied to the output of the converter unit 2. If the input voltage $V_{E'}$ drops below a certain minimum value, the discharging circuit connects the auxiliary capacitor 5 with the working capacitor 3 via the switch 6 and/or the second N-channel transistor 12, so that charge flows from the auxiliary capacitor 5 to the working capacitor 3. One detects or recognizes the flow of charge from the auxiliary capacitor 5 at the auxiliary capacitor voltage $V_H$ reduced according to the charge flow amount.

When the working capacitor 3 is again charged above a certain upper threshold value, the switch 6 opens and/or the second N-channel transistor 12 is conducting and the discharge of the auxiliary capacitor 5 is halted. One establishes this by detecting a constant auxiliary capacitor voltage $V_H$ for a certain short time. When the charging voltage of the working capacitor 3 again falls below the lower threshold value $V_{E'min}$, the switch 6 closes again and/or the second N-channel transistor 12 is again blocked, and the charge flows from the auxiliary capacitor 5 to the working capacitor 3.

The step form of the discharge curve for the auxiliary capacitor 5 is produced in this manner. It is also conceivable that the discharge curve of the auxiliary capacitor 5 is in the form of a continuous linear function, when the charge flowing from the auxiliary capacitor corresponds to the charge, which is received by the converter unit 2 for supply of the nominal voltage.

The foregoing features of the different embodiments may be combined in other different ways.

The disclosure in German Patent Application 103 08 411.8 of Feb. 27, 2003 is incorporated here by reference. This German Patent Application describes the invention described hereinabove and claimed in the claims appended hereinbelow and provides the basis for a claim of priority for the instant invention under 35 U.S.C. 119.

While the invention has been illustrated and described as embodied in a DC-DC converter circuit with holdover features, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

I claim:
1. A DC-DC converter circuit (1) comprising
   a converter unt (2) for converting an input voltage ($V_{E'}$) applied to an input of the converter unit into an output voltage ($V_A$) having a predetermined value;
   a first capacitor (5) for maintaining a value of the output voltage ($V_A$) for a predetermined time interval when the input voltage applied to the input of the converter unit (2) is interrupted;
   a charging circuit (4) for charging the first capacitor (5) with a supply voltage ($V_E$) that is larger than the input voltage, wherein each of the input voltage ($V_{E'}$), the output voltage ($V_A$), and the supply voltage ($V_E$) is a DC-voltage; and
   a discharging circuit for charging the converter unit (2) with charge from the first capacitor (5) when the input voltage ($V_{E'}$) is interrupted, whereby the value of the output voltage ($V_A$) is maintained for the predetermined time interval.

2. The DC-DC converter circuit as defined in claim 1, wherein the charging circuit (4) comprises a transformer (T), a rectifier (R) and/or an AC generator (G) supplied by the input voltage ($V_{E'}$).

3. The DC-DC converter circuit as defined in claim 1, wherein the charging circuit (4) comprises a charge pump (CP), in order to produce the input voltage ($V_{E'}$) from the supply voltage ($V_E$).

4. The DC-DC converter circuit as defined in claim 1, further comprising a second capacitor (3) connected to an input of the converter circuit (2) in order to be charged with the input voltage ($V_{E'}$), and wherein the charging circuit (4)

is formed to deliver the charge from the first capacitor (5) to the second capacitor (3) when the input voltage ($V_{E'}$) is interrupted.

5. The DC-DC converter circuit as defined in claim 4, wherein the first capacitor (5) is coupled by the discharging circuit with the second capacitor (3) so that the first capacitor (5) delivers said charge to the second capacitor (3) when a potential difference stored in the second capacitor (3) decreases below a threshold value.

6. The DC-DC converter as defined in claim 5, wherein the discharging circuit comprises a switching device, by which the first capacitor (5) is coupled with the second capacitor (3).

7. The DC-DC converter circuit as defined in claim 6, wherein the discharging circuit has a detection circuit for establishing whether or not the potential difference stored in the second capacitor (3) is less than another threshold value.

8. The DC-DC converter circuit as defined in claim 7, wherein the detection circuit gates the switching device when the potential difference stored in the second capacitor (3) is less than said another threshold value.

9. The DC-DC converter circuit as defined in claim 7, wherein the detection circuit blocks tile switching device when the potential difference stored in the second capacitor (3) exceeds said another threshold value by a predetermined amount.

10. The DC-DC converter circuit as defined in claim 7, wherein the detection circuit has a comparator circuit (7) with a hysteresis.

11. A method for operating a DC-DC converter circuit (1), wherein said DC-DC converter circuit comprises a converter unit (2) for converting an input voltage ($V_{E'}$) applied to an input of the converter unit to an output voltage ($V_A$) having a predetermined voltage value and a first capacitor (5) for maintaining the predetermined voltage value of the output voltage ($V_A$) for a predetermined time interval when the input voltage applied to the input of the converter unit is interrupted, said method comprising the steps of:

a) charging the first capacitor (5) with a supply voltage ($V_E$) that is greater than the input voltage when the input voltage ($V_{E'}$) is present, wherein each of the input voltage ($V_{E'}$), the output voltage ($V_A$), and the supply voltage ($V_E$) is a DC-voltage; and b) then supplying charge from the first capacitor (5) to the converter unit (2) when the input voltage ($V_{E'}$) is interrupted, whereby the output voltage ($V_A$) is maintained for the predetermined time interval.

* * * * *